US012621092B2

(12) United States Patent
Gad et al.

(10) Patent No.: US 12,621,092 B2
(45) Date of Patent: May 5, 2026

(54) ADAPTIVE INTERCELL INTERFERENCE AVOIDANCE FEEDBACK-DECISION WINDOW

(71) Applicant: Dell Products L.P., Round Rock, TX (US)

(72) Inventors: Omar Gad, London (GB); Yasmin Eldokany, New Cairo (EG); Rania Wael, Cairo (EG); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 449 days.

(21) Appl. No.: 18/313,413

(22) Filed: May 8, 2023

(65) Prior Publication Data

US 2024/0380532 A1 Nov. 14, 2024

(51) Int. Cl.
*H04L 5/00* (2006.01)

(52) U.S. Cl.
CPC .................................. *H04L 5/0032* (2013.01)

(58) Field of Classification Search
CPC .... H04L 5/0032; H04W 24/02; H04W 72/541
See application file for complete search history.

(56) References Cited

U.S. PATENT DOCUMENTS

2017/0202005 A1 7/2017 Madan et al.
2017/0346750 A1 11/2017 Wang et al.

2020/0187222 A1 6/2020 Rao et al.
2021/0051522 A1* 2/2021 Zhou ...................... H04W 24/08
2021/0105055 A1* 4/2021 Chae ...................... H04L 5/0057
(Continued)

FOREIGN PATENT DOCUMENTS

WO 2021/249637 12/2021
WO 2021/249638 12/2021
(Continued)

OTHER PUBLICATIONS

Office Action mailed Aug. 9, 2024 for U.S. Appl. No. 17/659,248, 64 pages.

(Continued)

*Primary Examiner* — Nizam U Ahmed
(74) *Attorney, Agent, or Firm* — Amin, Turocy & Watson, LLP

(57) ABSTRACT

The described technology is generally directed towards dynamically adapting the parameter data of an intercell interference avoidance feedback and decision window (e.g., sizing and frequency) to obtain interference-related data from a UE. The interference-related data analyzed from a returned window is used to recommend a decision to a ran node as to which radio resources should be avoided when scheduling UE-related communications to avoid intercell interference. A controller (e.g., RIC) dynamically attempts to optimize the frequency and periodicity of the intercell interference avoidance feedback and decision windows to be transmitted, based on measurements and KPIs from the RAN node, e.g., UE traffic pattern data and QoS requirements, as well as performance capability data of the node. The node can accept the window parameter data or reject the request for reprocessing by the controller.

20 Claims, 13 Drawing Sheets

(56) References Cited

U.S. PATENT DOCUMENTS

| | | | |
|---|---|---|---|
| 2023/0164629 A1* | 5/2023 | Rydén | H04W 28/26 |
| | | | 455/453 |
| 2023/0171738 A1 | 6/2023 | Di Girolamo et al. | |
| 2023/0209370 A1 | 6/2023 | Pateromichelakis et al. | |
| 2023/0336318 A1 | 10/2023 | Atawia et al. | |

FOREIGN PATENT DOCUMENTS

| | | | | |
|---|---|---|---|---|
| WO | 2022/167364 | 8/2022 | | |
| WO | WO-2022167364 A1 * | 8/2022 | | H04W 72/52 |

OTHER PUBLICATIONS

International Preliminary Report on Patentability for PCT Application Serial No. PCT/US2022/053276 dated Oct. 24, 2024, 8 pages.
European Office Action mailed Nov. 21, 2024 for European Patent Application No. 22851202.6, 3 pages.
Notice of Allowance mailed Dec. 6, 2024 for U.S. Appl. No. 17/659,248, 44 pages.
"O-RAN Operations and Maintenance Architecture" O-RAN.WG1. OAM-Architecture-v04.00, 2021, 55 pages.
International Search Report and Written Opinion mailed Feb. 20, 2024 for PCT Application No. PCT/US2023/036175, 15 pages.
O-RAN Working Group 3 Near-Real-time RAN Intelligent Controller E2 Service Model (E2SM), RAN Control, Technical Specification, ORAN.WG3.E2SM-RC-v01.01.00, 2020, 267 pages.
International Search Report and Written Opinion received for PCT Application Serial No. PCT/US2022/053276 dated Mar. 27, 2023, 13 pages.

* cited by examiner

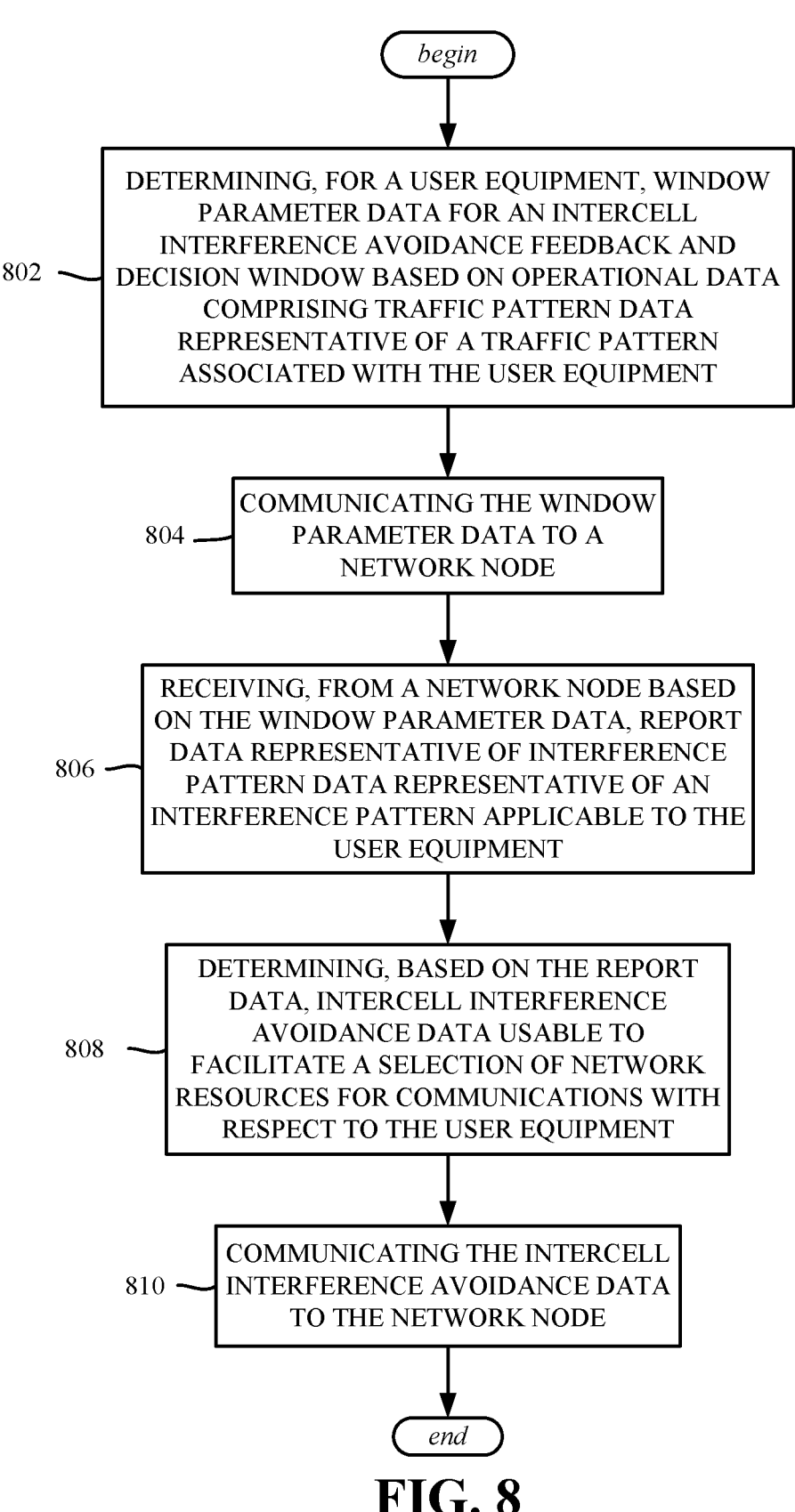

begin

802 — DETERMINING, FOR A USER EQUIPMENT, WINDOW PARAMETER DATA FOR AN INTERCELL INTERFERENCE AVOIDANCE FEEDBACK AND DECISION WINDOW BASED ON OPERATIONAL DATA COMPRISING TRAFFIC PATTERN DATA REPRESENTATIVE OF A TRAFFIC PATTERN ASSOCIATED WITH THE USER EQUIPMENT

804 — COMMUNICATING THE WINDOW PARAMETER DATA TO A NETWORK NODE

806 — RECEIVING, FROM A NETWORK NODE BASED ON THE WINDOW PARAMETER DATA, REPORT DATA REPRESENTATIVE OF INTERFERENCE PATTERN DATA REPRESENTATIVE OF AN INTERFERENCE PATTERN APPLICABLE TO THE USER EQUIPMENT

808 — DETERMINING, BASED ON THE REPORT DATA, INTERCELL INTERFERENCE AVOIDANCE DATA USABLE TO FACILITATE A SELECTION OF NETWORK RESOURCES FOR COMMUNICATIONS WITH RESPECT TO THE USER EQUIPMENT

810 — COMMUNICATING THE INTERCELL INTERFERENCE AVOIDANCE DATA TO THE NETWORK NODE end

FIG. 8

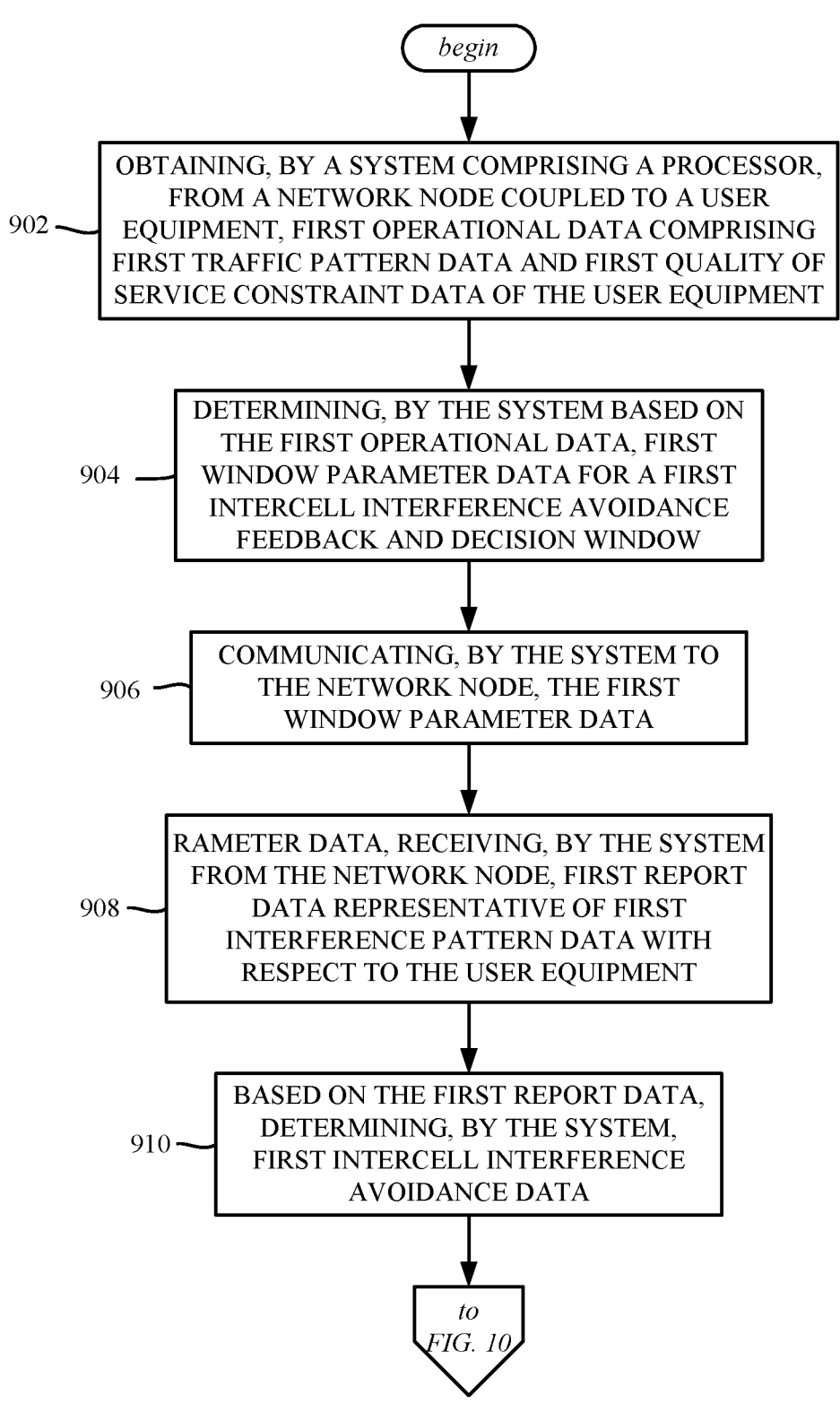

begin

902 — OBTAINING, BY A SYSTEM COMPRISING A PROCESSOR, FROM A NETWORK NODE COUPLED TO A USER EQUIPMENT, FIRST OPERATIONAL DATA COMPRISING FIRST TRAFFIC PATTERN DATA AND FIRST QUALITY OF SERVICE CONSTRAINT DATA OF THE USER EQUIPMENT

904 — DETERMINING, BY THE SYSTEM BASED ON THE FIRST OPERATIONAL DATA, FIRST WINDOW PARAMETER DATA FOR A FIRST INTERCELL INTERFERENCE AVOIDANCE FEEDBACK AND DECISION WINDOW

906 — COMMUNICATING, BY THE SYSTEM TO THE NETWORK NODE, THE FIRST WINDOW PARAMETER DATA

908 — RAMETER DATA, RECEIVING, BY THE SYSTEM FROM THE NETWORK NODE, FIRST REPORT DATA REPRESENTATIVE OF FIRST INTERFERENCE PATTERN DATA WITH RESPECT TO THE USER EQUIPMENT

910 — BASED ON THE FIRST REPORT DATA, DETERMINING, BY THE SYSTEM, FIRST INTERCELL INTERFERENCE AVOIDANCE DATA to
FIG. 10

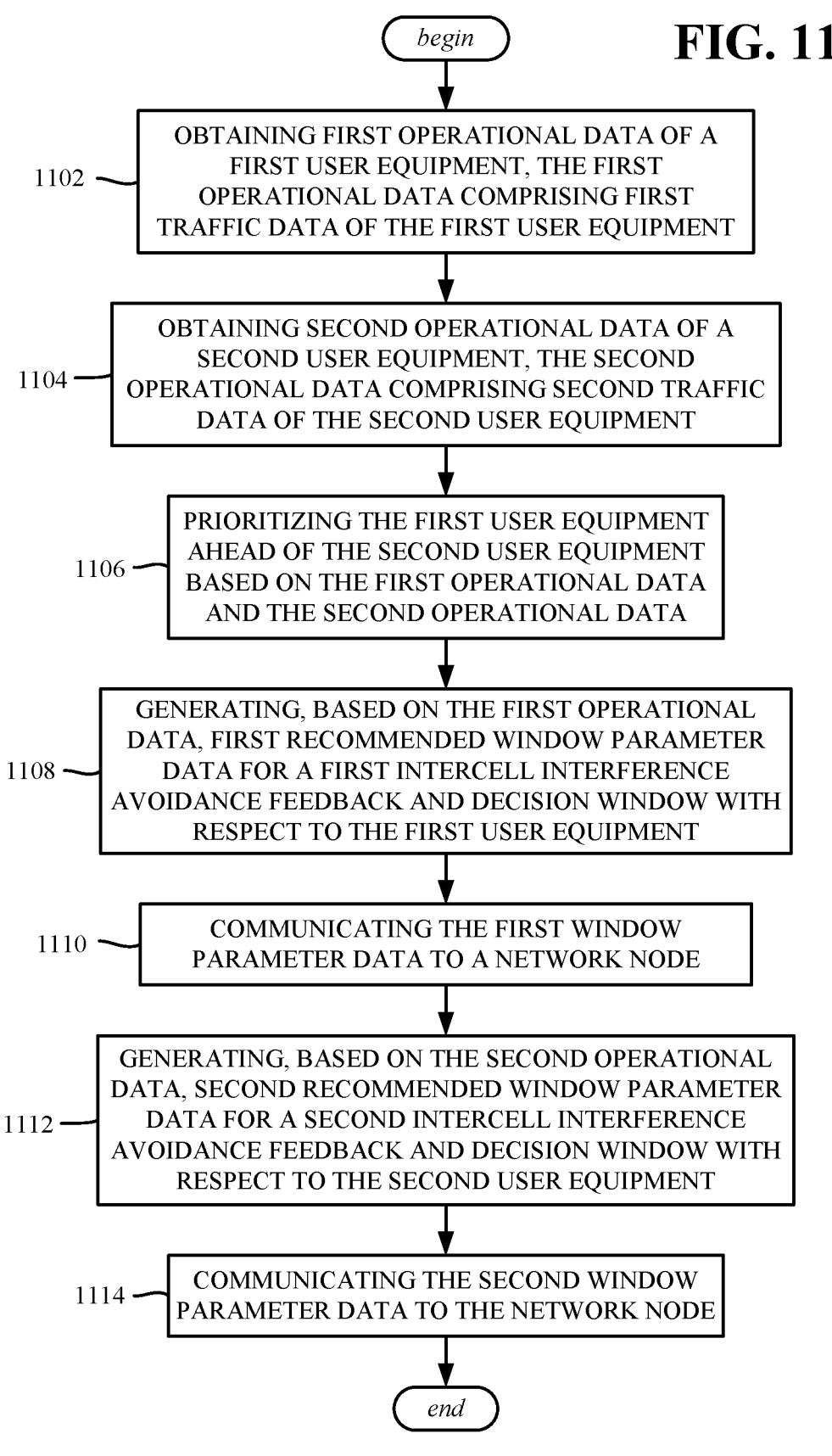

begin

1102 — OBTAINING FIRST OPERATIONAL DATA OF A FIRST USER EQUIPMENT, THE FIRST OPERATIONAL DATA COMPRISING FIRST TRAFFIC DATA OF THE FIRST USER EQUIPMENT

1104 — OBTAINING SECOND OPERATIONAL DATA OF A SECOND USER EQUIPMENT, THE SECOND OPERATIONAL DATA COMPRISING SECOND TRAFFIC DATA OF THE SECOND USER EQUIPMENT

1106 — PRIORITIZING THE FIRST USER EQUIPMENT AHEAD OF THE SECOND USER EQUIPMENT BASED ON THE FIRST OPERATIONAL DATA AND THE SECOND OPERATIONAL DATA

1108 — GENERATING, BASED ON THE FIRST OPERATIONAL DATA, FIRST RECOMMENDED WINDOW PARAMETER DATA FOR A FIRST INTERCELL INTERFERENCE AVOIDANCE FEEDBACK AND DECISION WINDOW WITH RESPECT TO THE FIRST USER EQUIPMENT

1110 — COMMUNICATING THE FIRST WINDOW PARAMETER DATA TO A NETWORK NODE

1112 — GENERATING, BASED ON THE SECOND OPERATIONAL DATA, SECOND RECOMMENDED WINDOW PARAMETER DATA FOR A SECOND INTERCELL INTERFERENCE AVOIDANCE FEEDBACK AND DECISION WINDOW WITH RESPECT TO THE SECOND USER EQUIPMENT

1114 — COMMUNICATING THE SECOND WINDOW PARAMETER DATA TO THE NETWORK NODE end

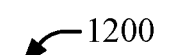
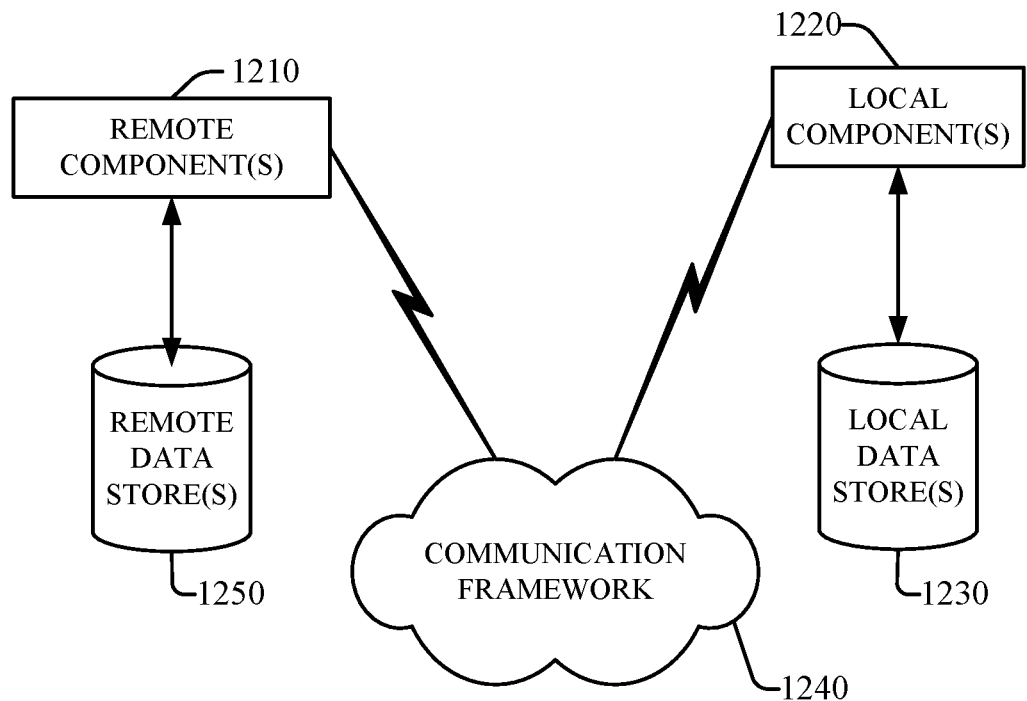
FIG. 12

ADAPTIVE INTERCELL INTERFERENCE AVOIDANCE FEEDBACK-DECISION WINDOW

BACKGROUND

In wireless network communications, intercell interference results when neighboring cells are transmitting simultaneously. In general, intercell interference can result in low network key performance indicators (KPIs), e.g., low spectral efficiency, and low quality of service (QoS). Indeed, intercell interference decreases bandwidth efficiency and can violate a user equipment's (UE's) quality of service (QoS) requirements.

The impact of intercell interference depends on UE locations relative to their serving cells, as well as the interfering neighbor cells. As such, intercell interference mitigation techniques try to identify impacted UEs and select spectrum resources that can be used by each cell to avoid intercell interference.

Intercell interference mitigation techniques include a null beamforming approach, using "beam nulls" directed towards UEs served by neighboring cells to avoid interference. In an alternative sub-band channel quality indictor (CQI) approach, a UE reports channel quality in each part of the spectrum (e.g., each resource block group). A scheduler then selects resource block groups with highest channel quality for each UE. However, the reported quality is averaged over time durations which depend on UE implementations, and scattering UE data transmission over multiple time slots can result in excessive usage of control channels. In a channel reuse approach, frequency can be reused between different cells such that static non-overlapping parts of the spectrum are allocated to neighboring cells. This, however, results in low spectral efficiency when the traffic load is not uniformly distributed across the neighboring cells, and further, reconfiguring the spectrum allocation to each cell can result in service interruptions to connected users.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 8 is a flow diagram of example operations directed towards determining window parameter data for an intercell interference avoidance feedback and decision window based on operational data comprising traffic pattern data representative of a traffic pattern associated with a user equipment, in accordance with various aspects and implementations of the subject disclosure.

FIGS. 9 and 10 comprise a flow diagram of example operations directed towards changing parameter data for an intercell interference avoidance feedback and decision window upon determining that a user equipment's traffic pattern has changed, in accordance with various aspects and implementations of the subject disclosure.

FIG. 11 is a flow diagram of example operations directed towards prioritizing a first user equipment ahead of a second user equipment with respect to generating recommended window parameter data, in accordance with various aspects and implementations of the subject disclosure.

FIG. 12 is a block diagram representing an example computing environment into which aspects of the subject matter described herein may be incorporated.

DETAILED DESCRIPTION

Figure 1:
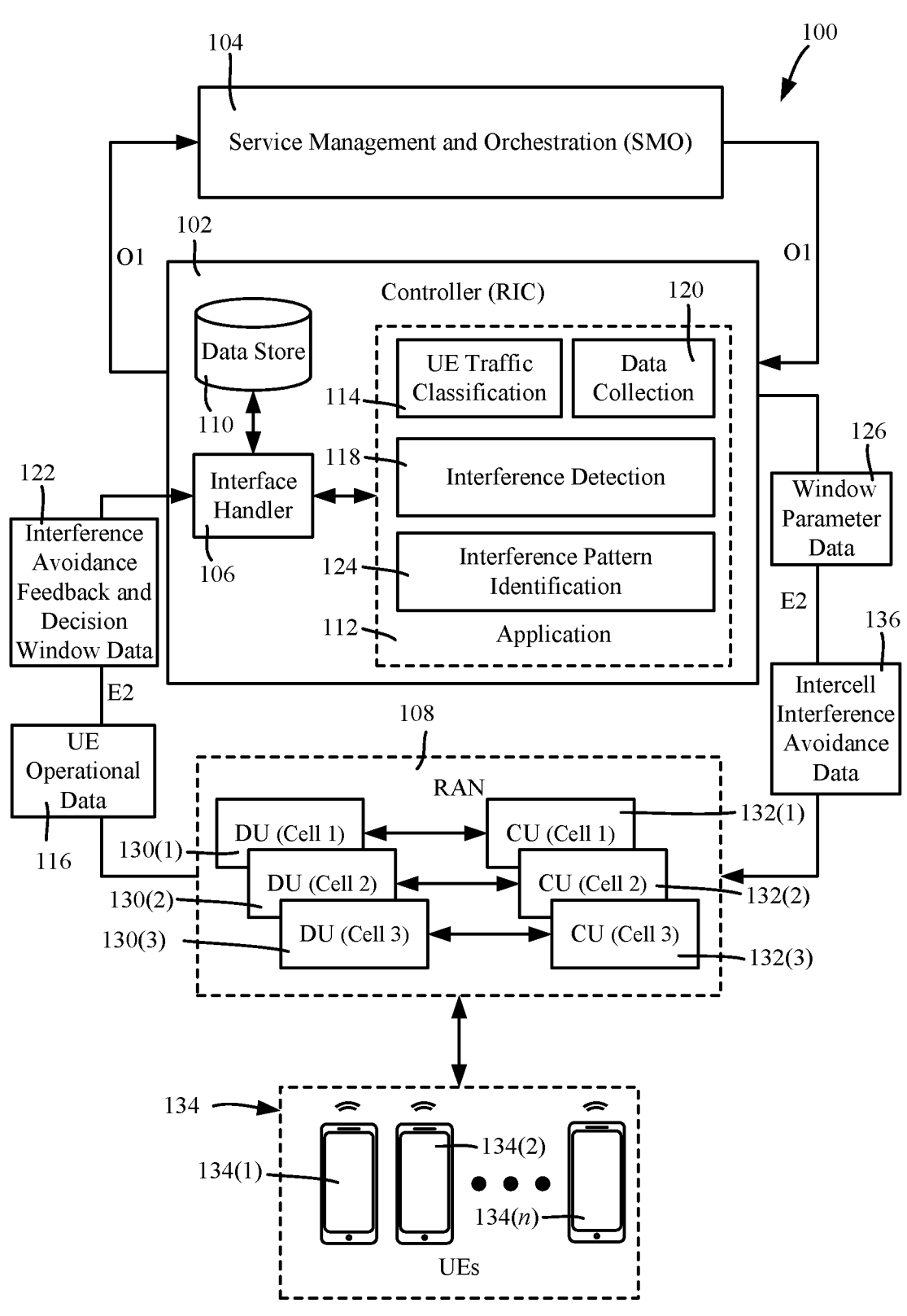
FIG. 1 is a block diagram of an example system/architecture including a controller configured to detect interference patterns via adaptable (dynamic) reporting windows, in accordance with various aspects and implementations of the subject disclosure.

The technology described herein is generally directed towards adapting the frequency and transmission time intervals of intercell interference avoidance feedback and decision (reporting) windows based on traffic models/patterns of user equipment and their quality of service (QoS) requirements (e.g., constraint data, such as latency delays). In general, a centralized controller collects the reporting windows comprising UE data related to intercell interference, detects interference patterns in those reporting windows and returns intercell interference avoidance data (e.g., recommended, preferred time slot utilization lists for use by cell schedulers) to connected network nodes so as to mute transmission on some of the radio resources during the data bursts of neighboring cells.

In general and as described herein, the interference avoidance feedback and decision (reporting) windows in which the collected data is analyzed can have variable parameter data, including window size and/or window reporting frequency. The controller determines the parameter data for a given reporting window based on each corresponding UE's operational data, including traffic pattern data and QoS-related data. The controller can also factor in the capability data of a given network node in determining the parameter data of an interference avoidance feedback and decision window. In the event that conditions change, e.g., a UE has switches to a different traffic pattern, the interference avoidance feedback and decision window is adapted for the changed conditions; (this is in contrast to static windows, which have been found to be suboptimal for UEs with aperiodic interference and delay-sensitive applications, or having a small window that causes extra CPU and memory utilization during high load scenarios).

It should be understood that any of the examples herein are non-limiting. As one example, the technology is generally described herein in an O-RAN (open radio access network) environment, however this is only an example, and the technology can be implemented in similar environments. Indeed, the technology is generally described can operate in accordance with any 5G, next generation communication technology, or existing communication technologies. Thus, any of the embodiments, aspects, concepts, structures, functionalities or examples described herein are non-limiting, and the technology may be used in various ways that provide benefits and advantages in data storage and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

One or more embodiments subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100 including a controller 102, that, among other operations, provides an intercell interference avoidance service, which, in general, mutes transmission on some radio resources during data bursts of neighboring cells. In one example implementation depicted in FIG. 1, in which the system is O-RAN compatible, the controller 102 (e.g., a RAN intelligent controller (RIC)) is coupled via the O1 interface to a service management and orchestration (SMO) component 104, which handles the orchestration, management, and automation aspects of RAN elements.

The controller 102 includes an interface handler 106 that allows the controller 102 to receive data from cooperating cells, collectively represented by the RAN 108 and its network nodes, along with a data store 110 (e.g., database) that stores data received over the interface hander 106. Such data includes, but is not limited to, key performance indicators and allocation data related to a previous reporting window.

The example controller 102 runs an application program 112 or the like including a user equipment (UE) traffic classification module 114 that detects UE operational data 116 (the traffic model/pattern for UEs, collectively 134) coupled to the controller 102 via a RAN 120 as described herein, and can classify each UE's use case type, e.g., identified through its packet inter-arrival rate as ultra reliable low latency communications (URLLC) versus mobile broadband (MBB) versus machine type communications (MTC) applications. An interference detection module 118 of the controller 102 collects (block 120) UE measurements/data in interference avoidance feedback and decision window data 122, and based on those measurements detects which of the UEs suffer interference.

More particularly, an interference pattern identification module 124 identifies interference-related patterns in the interference avoidance feedback and decision window data 124, e.g., based on negative acknowledgments (NACKs) from the same UE. For UEs that need a reporting window change as described herein, e.g., a UE has changed its traffic type, the interference pattern identification module 124 (or other component of the controller 102) sends out a subscription request to the appropriate node of the RAN 108 with adjusted window parameter data 126, such as including window reporting frequency as described herein.

Also shown as part of the RAN 108 are example RAN network node components including centralized unit (DU) nodes and distributed unit (DU) nodes applicable to 4G and 5G technologies, supporting MBB, URLLC and MTC applications. More particularly, the example system of FIG. 1 shows the controller 102 coupled via an E2 interface (e.g., in O-RAN compatible scenarios) to the RAN 108 having three cells, each cell comprising respective distributed units 130(1)-130(3) and centralized units 132(1)-132(3). As is understood, while three DU/CU network elements are shown in this example, it is understood that a controller 102 can be coupled to any practical number of elements. Radio units (RUs), not explicitly shown in FIG. 1, are also present as part of the network elements of the RAN 108.

Further shown in FIG. 1 are user equipment (UE) devices 134(1)-134(n), communicating via the RAN nodes 120. Such UE devices 134 (1)-134 (n) can be one type of any number of (e.g., URLLC) devices, including, but not limited to medical-related devices, vehicles, sensors, small measuring devices and so forth, which can be moving at relatively high speeds, e.g., on drones, mobile robots and so forth. The non-limiting term "user equipment" or "UE" can refer to any type of device that can communicate with network nodes (the RAN 120) in the cellular or mobile communication system/architecture 100. Non-limiting examples of UE devices 134(1)-134(n), include target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. One or more of the UE devices **134(1)-134(*n*)** can also comprise IoT devices that communicate wirelessly.

In general, the controller 102 is configured to estimate intercell interference over what can be a small time granularity, e.g., a single transmission time interval (TTI), and the controller 102 can provide intercell interference avoidance data 136, e.g., time recommendations regarding preferred time slots that can be used by schedulers at cells, (e.g., schedulers at network nodes) of the RAN 108 to avoid inter-cell interference. The controller 102 can leverage the sporadic traffic of the neighboring cells at network nodes and the controller 102 can identify the time slots at which peak traffic demand is transmitted over the air. The controller 102 can guide the resource schedulers at network nodes to avoid sending data over the air to some of UEs during times likely to experience high intercell interference.

Furthermore, the controller 102 can rely on data with multiple granularities, including TTI-level information and/or aggregated network performance metrics. The TTI-level information can allow the controller 102 to have an explicit view of neighboring cell traffic and resultant interference patterns, whereby the controller 102 can build an accurate preferred slot list. The controller 102 need not require additional reconfigurations of UEs or cells/network nodes, whereby the controller 102 can reduce signaling overhead and service interruptions.

The controller 102 (as well as schedulers at network nodes) can consider QoS levels for the UEs **134(1)-134(*n*) while selecting the time recommendations, including preferred slots to avoid QoS violations when dealing with UE traffic with stringent delay requirements. For instance, the controller 102** (and/or node schedulers) can assess the risk of QoS violation (e.g., packet exceeds its delay budget due to delaying the transmission to a preferred slot) and can compare that to the risk of transmitting the packet immediately in a non-preferred slot which results in packet drops due to high interference.

Figure 2A:
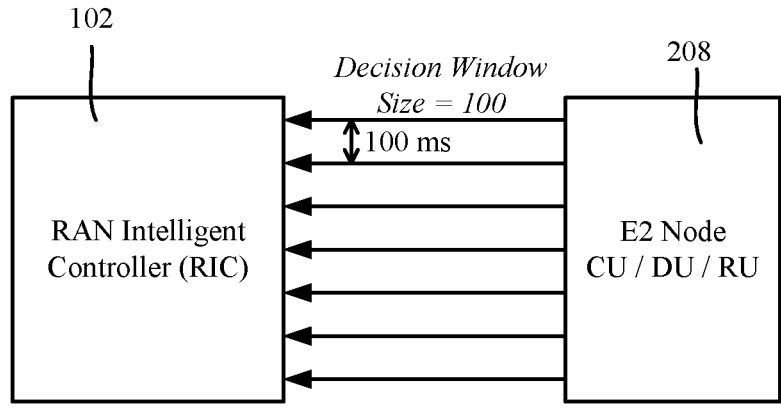
FIGS. 2A and 2B are directed towards an example of adapting a dynamic intercell interference avoidance feedback-decision window with respect to ultra reliable low latency (URLLC) communications of a user equipment (UE), in accordance with various aspects and implementations of the subject disclosure.
Figure 2B:
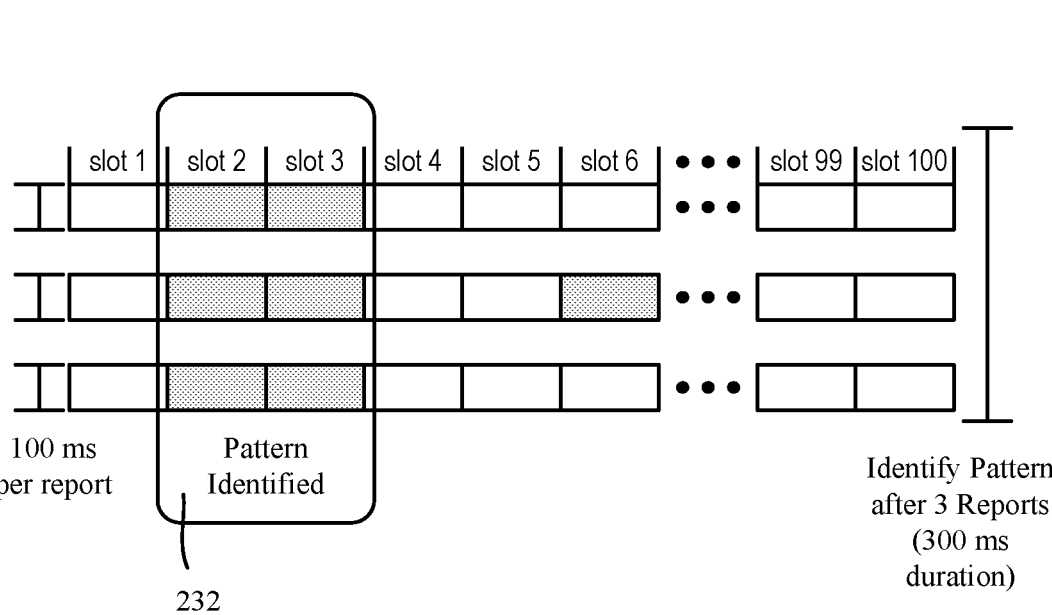

Turning to an example implementation of the technology described herein, FIGS. 2A and 2B show the concept of a dynamic intercell interference avoidance feedback-decision window 230 for a URLLC use case example, such as for autonomous vehicles, drones and the like with high reliability and low latency requirements. In this example, the feedback-decision window 230 is frequently sent to the controller 102, e.g., reported by an E2 node 208 (CU/DU/RU) every 100 milliseconds (ms) per report, with a relatively small decision window size, e.g., 100 slots (FIG. 2B). The window can include hybrid automatic repeat request (HARQ) feedback, e.g., corresponding to acknowledgments (ACK) data and NACK data received from a UE at a serving cell over the physical uplink control channel (PUCCH) or physical uplink scheduling channel (PUSCH). The HARQ feedback list can indicate whether downlink data sent on a physical downlink scheduling channel (PDSCH) was correctly decoded or not. Other data, e.g., KPI data, PRB (physical resource block) utilization data, SINR (signal to interference plus noise ratio) data, automatic neighbor relations (ANR) data and the like can be sent instead of or in addition to HARQ feedback. A machine learning model can be trained in a non-real time RIC on RSRP reference signal received power) RSRQ (reference signal received quality), and MCS (modulation and coding scheme) data generated from simulations and drive tests; then the trained model can be passed to a near-real time RIC for runtime inference of interference and potential time slots to be utilized.

In general, the data transmission load is thus heavier with smaller decision window sizes, as shown in FIG. 2A, to guarantee quicker (e.g., 300 ms total) identification of interference patterns. As shown in FIG. 2B, the 100-slot reporting window 230 has an interference pattern 232 detected by the controller 102 after three decision window transmissions taking a total of 300 milliseconds. In the example of FIG. 2B, interference is detected in slots 2 and 3 in each of the three reports, depicted by shaded blocks (in contrast to unshaded blocks). Interference was also detected in slot 6 of the second report, however this is not detected as part of a recurring pattern.

Figure 3A:
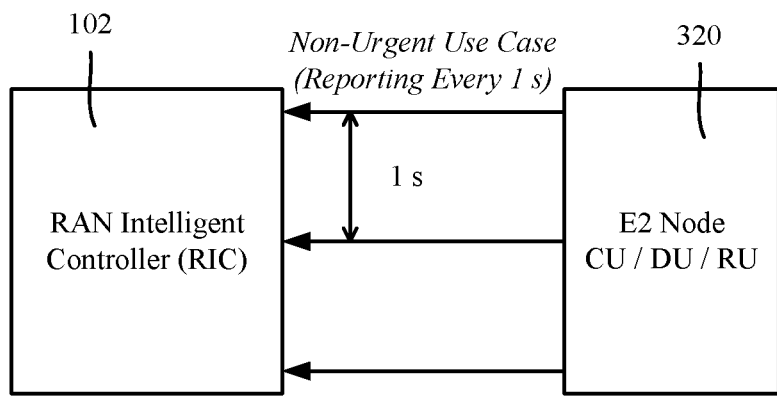
FIGS. 3A and 3B are directed towards an example of adapting a dynamic intercell interference avoidance feedback-decision window with respect to non-URLLC communications of a UE, in accordance with various aspects and implementations of the subject disclosure.
Figure 3B:
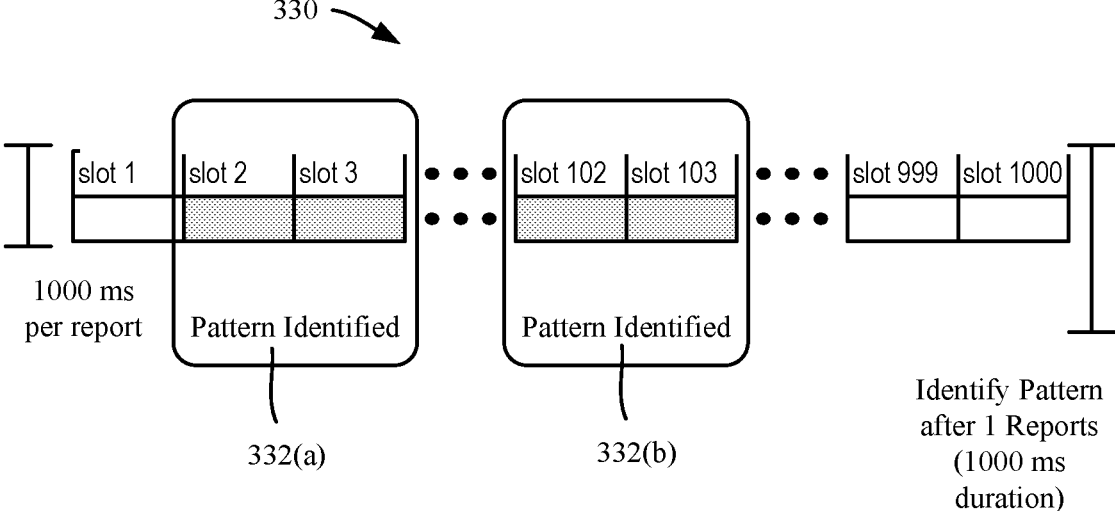

FIGS. 3A and 3B show a dynamic intercell interference avoidance feedback-decision window in a non-URLLC use case example. For example, video streaming does not have the same latency requirements as any URLLC use case, whereby the controller 102 can reduce the heavy load of frequent transmissions in favor of a larger decision window. As shown in the example of FIGS. 3A and 3B, the feedback-decision window is sent to the controller 102 less frequently, e.g., reported by an E2 RAN node 320 (CU/DU/RU) every 1,000 ms (i.e., one second) per report, with a relatively larger decision window size, e.g., 1,000 slots (FIG. 3B). This results in significantly less reporting/reporting overhead between the E2 node and the controller 102, however the pattern identification is slightly slower (over a longer, 1,000 ms timeframe) than the URLLC use case example (300 ms timeframe) of FIGS. 2A and 2B. indeed, as shown in FIG. 3B, the 1,000-slot reporting window 330 has an interference pattern detected by the controller 102 in 322(*a*) and 332(*b*) after one decision window (report) transmission, taking a total of 1,000 milliseconds.

Although the above examples in FIGS. 2A, 2B, 3A and 3B show certain typical use cases, it is understood that other use cases can occur. For example, a UE in one video streaming application use case with normal buffering and one set of QoS constraints may be not acceptable for another video streaming application, such as a live video conference or event that has more stringent QoS constraints. Thus, the window return frequency can be increased for the latter case (e.g., every 500 ms) instead of every 1,000 ms for the former use case of FIGS. 2A and 2B, yet not necessarily as high a rate as a URLLC use case (every 100 ms) of FIGS. 3A and 3B. As can be readily appreciated, a user equipment scrolling through text data such as social media/text messages/email can be assigned a far less frequent reporting window.

Figure 4:
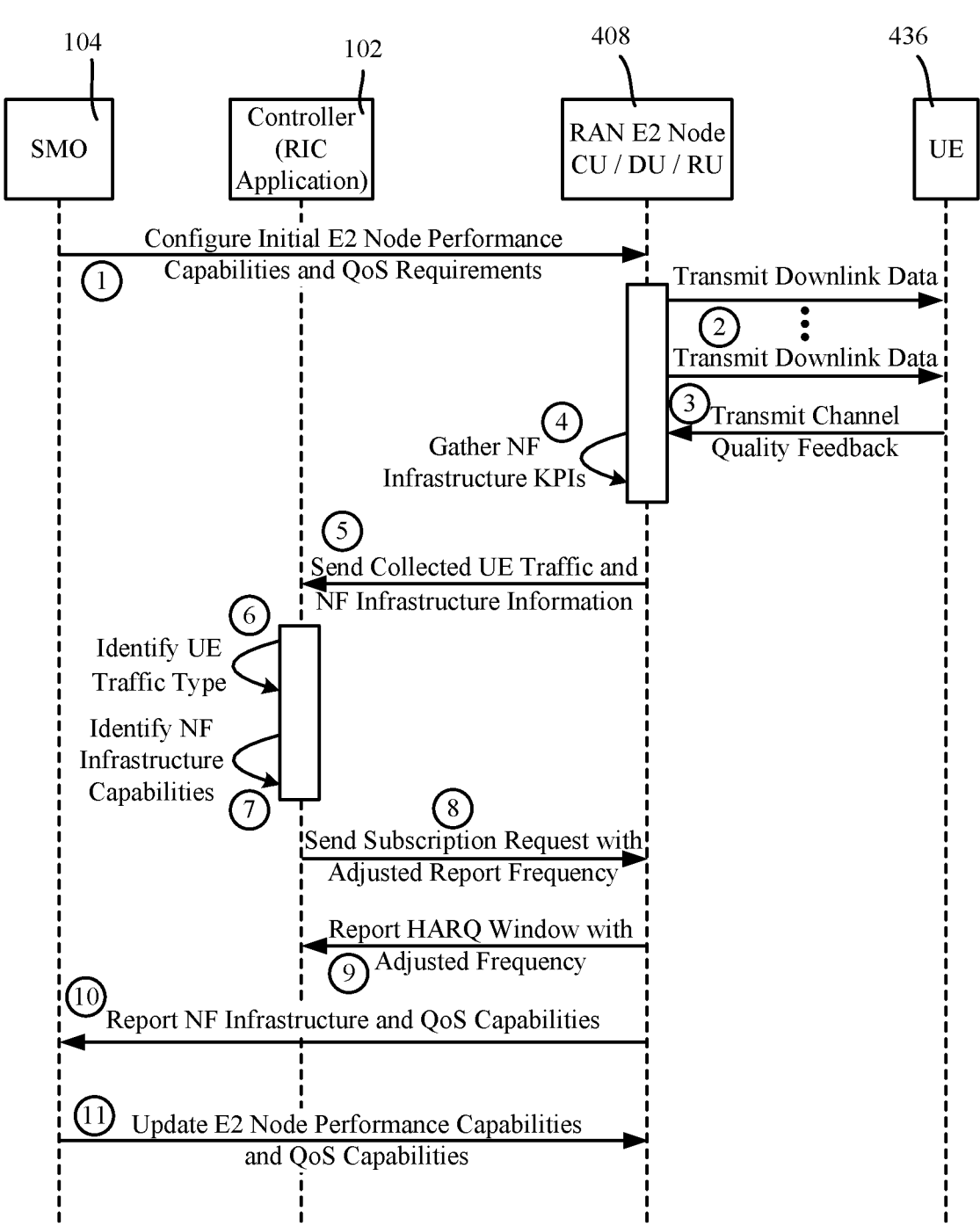
FIG. 4 is a sequence/dataflow diagram of example operations performed by various network equipment with respect to an adaptive interference avoidance feedback-decision window based on traffic data of a UE and network function (NF) infrastructure information, in accordance with various aspects and implementations of the subject disclosure.

FIG. 4 shows an example sequence and dataflow diagram of a dynamic feedback window adjustment flow for a single UE 436; this flow is performed for each UE coupled to a given RAN E2 node, e.g., the RAN node 408. In FIG. 4, the SMO 104 configures initial performance capabilities and QoS requirements of the RAN node 408, as represented by the arrow labeled one (1). Based on this configuration, the RAN node 408 transmits some number of downlink data transmissions (arrow two (2)) to the UE 436, after which the UE 436 transmits back channel quality feedback data (arrow three (3)).

The initial feedback and decision window can be determined for each UE based on current QoS requirements and traffic pattern (e.g., packet interarrival rate). As described herein, the feedback and decision window parameter data is thereafter dynamically adapted based on time-varying traffic, new services for the UE, or network capability variation (e.g., due to slicing or load variation). The adaptation is triggered by the controller or the RAN node. This can be based on capability exchange with the RAN node, QoS reconfiguration by the operator/SMO or missing/delayed executions of the intercell interference decisions.

The RAN E2 node 408 gathers information (arrow four (4)) about the UE traffic and network function infrastructure key performance indicators (KPIs), and sends corresponding data (arrow five (5)) to the controller 102 (RIC application). The controller 102 identifies the traffic model of the UE 436 (arrow six (6)) and the infrastructure capabilities of the RAN node 408 (arrow seven (7)). The controller 102 then, as needed, adjusts the dynamic window parameter data to suit the needs of the UE traffic use case and utilization of the RAN node's performance capabilities. In this example, the controller 102 sends a subscription request to the RAN node 408 with an adjusted parameter data (e.g., window report frequency and/or size) as represented by arrow eight (8). The RAN node 408 reports the HARQ window with adjusted frequency as represented by arrow nine (9).

As represented by arrow ten (10), the RAN node 408 also reports the network function infrastructure data and QoS capability data to the SMO 104. As needed, in this example represented by arrow eleven (11), the SMO 104 updates the RAN node's performance capability data and QoS capability data.

Figure 5:
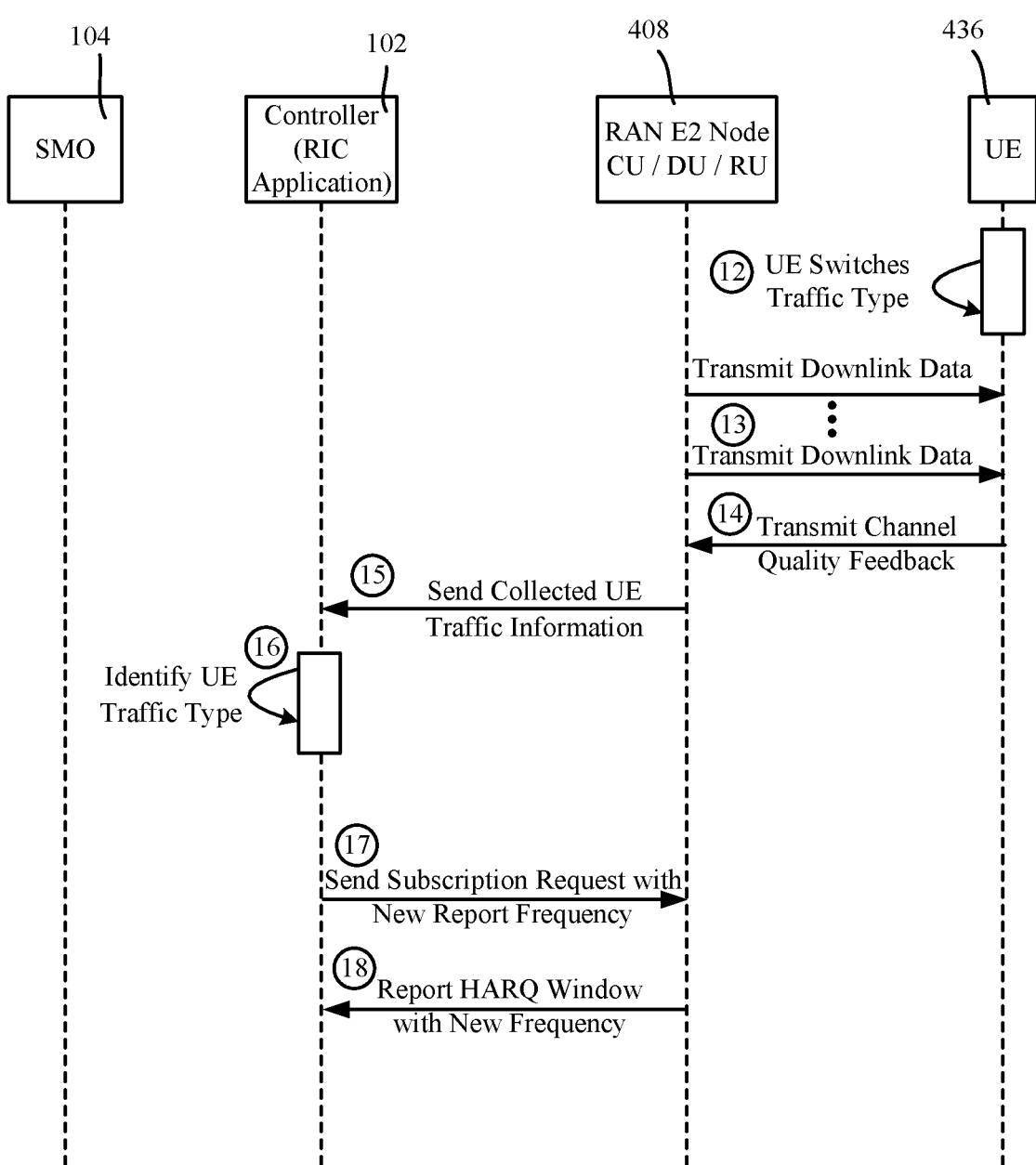
FIG. 5 is a sequence/dataflow diagram of example operations performed by various network equipment with respect to changing the adaptive interference avoidance feedback-decision window based on changed traffic data of a UE, in accordance with various aspects and implementations of the subject disclosure.

FIG. 5 shows an example of a dynamic window parameter data change triggered by a change in the UE traffic pattern, as represented by arrow twelve (12), based on continuing from FIG. 4. As before, the RAN node 408 transmits some number of downlink data transmissions (arrow thirteen (13)) to the UE 436, after which the UE 436 transmits back channel quality feedback data (arrow fourteen (14)).

As represented by arrow fifteen (10), the RAN node 408 sends collected UE traffic information to the controller 102 (RIC application). Based on the collected UE traffic information, the controller 102 (UE traffic classification 114, FIG. 1) identifies the UE traffic type as represented by arrow sixteen (16).

In this example, based on the changed UE traffic type the controller 102 sends a subscription request to the RAN node 408 with a new parameter data (e.g., window report frequency and/or size), as represented by arrow seventeen (17). The RAN node 420 reports the HARQ window with the new frequency as represented by arrow eighteen (18). Thus, when the UE switches to another use case and the traffic has changed, through the patterns reported by the RAN node 408, the controller identifies the traffic change and adjusts the dynamic window to align with the new traffic type.

Figure 6:
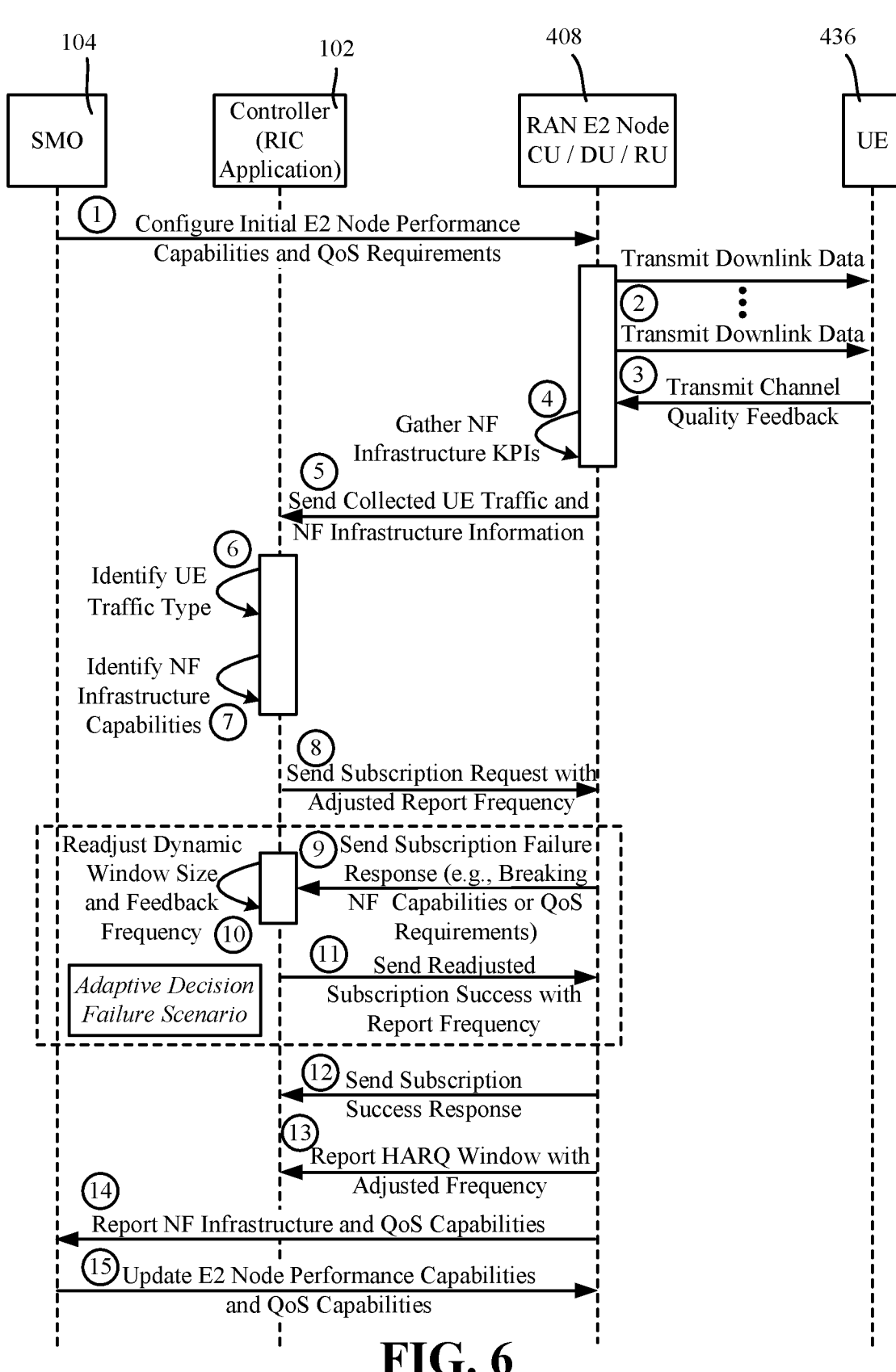
FIG. 6 is a sequence/dataflow diagram of example operations performed by various network equipment with respect to handling a subscription request failure, by changing the adaptive interference avoidance feedback-decision window for a UE, in accordance with various aspects and implementations of the subject disclosure.

FIG. 6 shows another example, wherein in this scenario, the RAN node 408 (e.g., a DU) rejects a subscription request, e.g., due to infrastructure limitations and/or QoS requirements. Note that labeled arrows one (1) through eight (8) in FIG. 6 mirror those previously described herein with reference to FIG. 4, whereby the description thereof is thus not repeated for purposes of brevity.

Because in this example the RAN node 408 rejects the subscription request from the controller with an adjusted report frequency, arrow nine (9) of FIG. 6 (unlike FIG. 4) represents sending a subscription failure response (e.g., not supportable by the RAN node 408 because of breaking network function capabilities or QoS requirements). The failure response can include data indicative of a reason for the rejection and/or a recommendation for what adjusted report parameter data is acceptable to the RAN node 408. For example, the RAN node may not be able to keep up with the frequency of reporting the feedback, and can request a different frequency, e.g., 500 ms instead of 100 ms.

Based on the information received in the failure response, as represented by arrow ten (10) of FIG. 6, the controller 102 readjusts the dynamic window parameter data (e.g., size and frequency) and sends a readjusted subscription request at arrow eleven (11) to the RAN node 408. Is this example the readjusted subscription request succeeds, whereby the RAN node 408 sends a subscription success response to the controller at arrow twelve (12).

The arrows thirteen (13) through fifteen (15) of FIG. 6 are similar to arrows nine (9) through eleven (11) of FIG. 4. Thus, as shown in FIG. 6, the RAN node 408 reports the HARQ window with adjusted frequency as represented by arrow thirteen (13). As represented by arrow fourteen (14), the RAN node 408 reports the network function infrastructure data and QoS capability data to the SMO 104. As needed, in this example represented by arrow fifteen (15), the SMO 104 updates the RAN node's performance capability data and QoS capability data.

Figure 7:
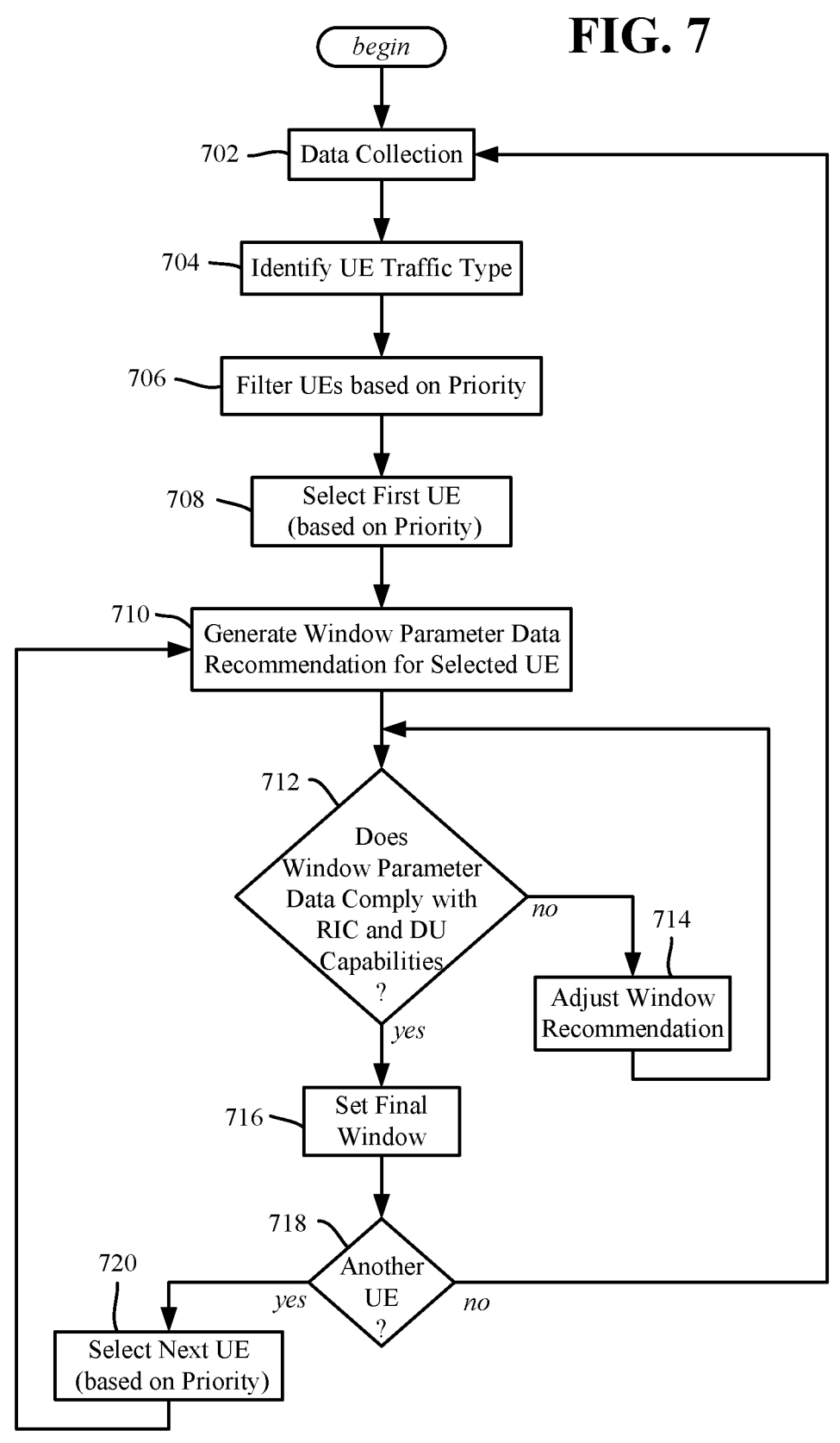
FIG. 7 is a flow diagram of example operations performed by a controller in generating adaptive interference avoidance feedback-decision windows for UEs, in accordance with various aspects and implementations of the subject disclosure.

FIG. 7 is a flow diagram showing example operations of a controller (e.g., the controller 102) with respect to data collection, traffic classification, UE prioritization and generating a dynamic window for sending the subscription request to a network node. As shown at operation 702, the controller performs data collection, by which the controller collects network-related data including, but not limited to, processing capability of network functions (e.g., CPU utilization), link capacity of the network functions (e.g., controller and DU), and packet delay on the E2 interface. The controller UE-related data, including, but not limited to, for each UE, QoS requirements/constraint data, traffic pattern data, and UE time slice data.

As represented by operation 704, the UE traffic pattern and time slice data is used to identify the UE traffic type. At operation 706, the traffic type and QoS requirement data of each UE are used to prioritize UEs relative to one another, (e.g., URLLC over enhanced mobile broadband) with respect to recommended window parameter data, e.g., window size and/or window reporting frequency.

As represented by operations 708, 718 and 720, the controller loops through the list of UEs ordered based on priority, in order to generate recommended dynamic windows, e.g., based on traffic pattern type and QoS requirements. At operation 712, if the initial recommended window does not comply with network function (node) requirements, the controller adjusts the window at operation 714, looping back as needed until compliant. Once the window is compliant, a final window (parameter data) is set, for sending as part of the subscription flow for the corresponding UE. This facilitates balancing the limited resources of a given node.

Although not explicitly shown in FIG. 7, as shown in FIGS. 4-6, the final windows (window parameter data) for the UEs are sent to their corresponding network nodes. This can be per UE/node as in the examples of FIGS. 4-6, or part of a batch request for multiple UEs' windows to a given node.

One or more aspects can be embodied in network equipment and/or a system, such as represented in the example operations of FIG. 8, and for example can include a memory that stores computer executable components and/or operations, and a processor that executes computer executable components and/or operations stored in the memory. Example operations can include operation 802, which represents determining, for a user equipment, window parameter data for an intercell interference avoidance feedback and decision window based on operational data comprising traffic pattern data representative of a traffic pattern associated with the user equipment. Example operation 804 represents communicating the window parameter data to a network node. Example operation 806 represents receiving, from a network node based on the window parameter data, report data representative of interference pattern data representative of an interference pattern applicable to the user equipment. Example operation 808 represents determining, based on the report data, intercell interference avoidance data usable to facilitate a selection of network resources for communications with respect to the user equipment. Example operation 810 represents communicating the intercell interference avoidance data to the network node.

The window parameter data can include at least one of: window report frequency data representative of a frequency with which the receiving of the report data occurs or window report size data representative of a size applicable to the report data.

The operational data further can include quality of service-related data representative of a quality of service specification applicable to the user equipment.

The operational data further can include performance capability data representative of a performance capability of the network node.

The performance capability data of the network node can include at least one of: network function infrastructure capability data representative of a network function infrastructure capability, or network function link capacity data representative of a network function link capability.

The window parameter data can be first window parameter data for a first intercell interference avoidance feedback and decision window, the operational data can be first operational data, the traffic pattern data can be first traffic data representative of a first traffic pattern associated with the user equipment, and further operations can include determining, based on information returned by the network node, that the first operational data has changed to second operational data that is different from the first operational data, the second operational data comprising second traffic pattern data, representative of a second traffic pattern associated with the user equipment, that is different from the first traffic pattern data, determining second window parameter data for a second intercell interference avoidance feedback and decision window based on the second operational data, wherein the second window parameter data is different from the first window parameter data and is usable to facilitate a further selection of the network resources for further communications with respect to the user equipment, and communicating, to the network node, the second window parameter data.

Further operations can include receiving, from the network node in response to the communicating of the second window parameter data, a communication indicating that the second window parameter data is not supportable by the network node, in response to the communication, determining third window parameter data for a third feedback and decision window, and communicating the third window parameter data to the network node.

The communication can include window parameter data-related information, and determining the third window parameter data can include processing the window parameter data-related information.

The network equipment can include a radio access network intelligent controller, and communicating the window parameter data to the network node can include sending a subscription request from the radio access network intelligent controller to the network node.

The network node can include at least one of: a centralized unit, a distributed unit, or a radio unit.

The report data can correspond to at least one of: hybrid automatic repeat request information of the user equipment, or reference signal received quality information of the user equipment.

The traffic pattern data can include packet interarrival rate data representative of a packet interarrival rate applicable to communicating with the user equipment.

Figure 10:
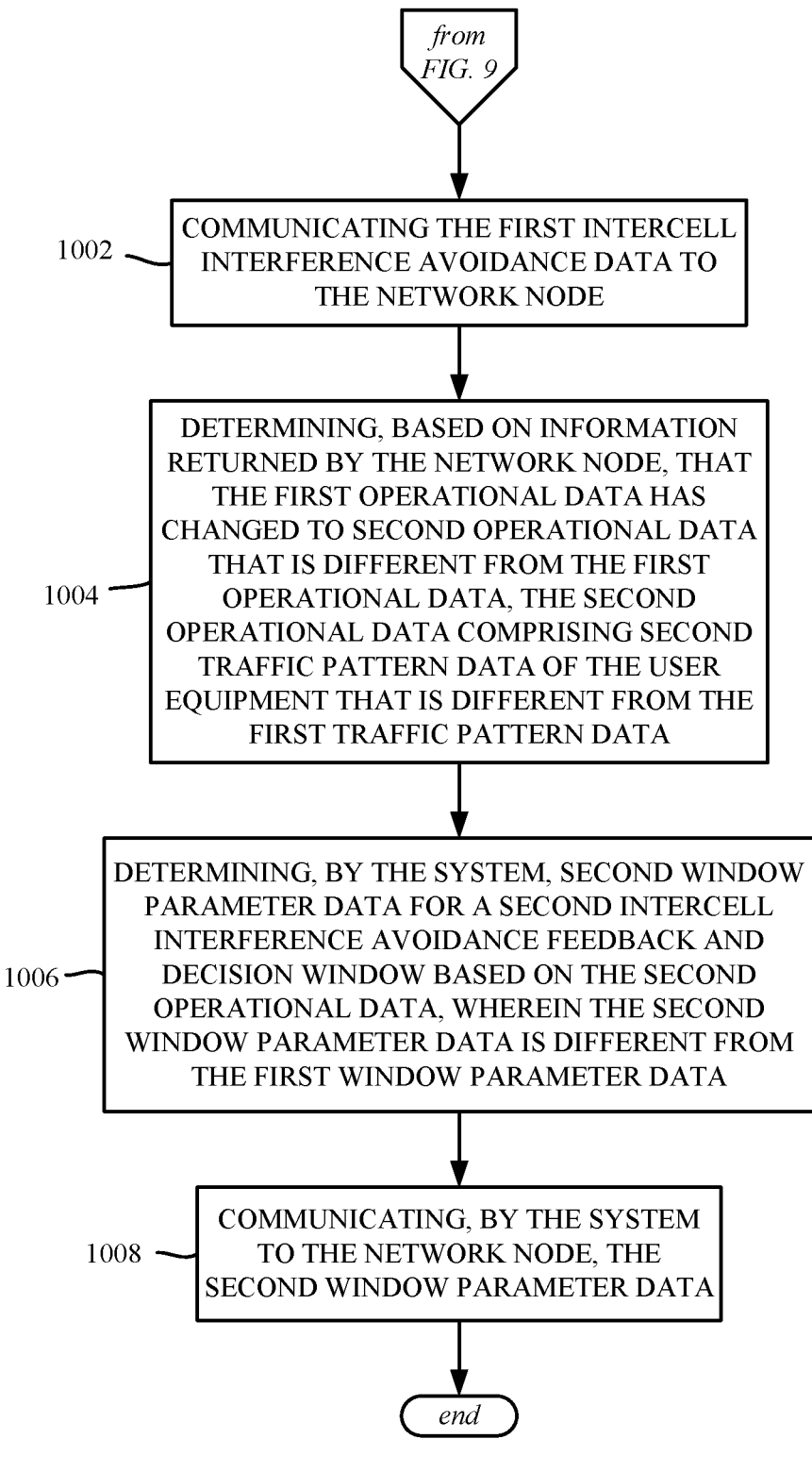

One or more example aspects, such as corresponding to example operations of a method, are represented in FIGS. 9 and 10. Example operation 902 of FIG. 9 represents obtaining, by a system comprising a processor, from a network node coupled to a user equipment, first operational data comprising first traffic pattern data and first quality of service constraint data of the user equipment. Example operation 904 represents determining, by the system based on the first operational data, first window parameter data for a first intercell interference avoidance feedback and decision window. Example operation 906 represents communicating, by the system to the network node, the first window parameter data. Example operation 908 represents based on the first window parameter data, receiving, by the system from the network node, first report data representative of first interference pattern data with respect to the user equipment. Example operation 910 represents based on the first report data, determining, by the system, first intercell interference avoidance data. Example operation 1002 of FIG. 10 represents communicating the first intercell interference avoidance data to the network node. Example operation 1004 represents determining, based on information returned by the network node, that the first operational data has changed to second operational data that is different from the first operational data, the second operational data comprising second traffic pattern data of the user equipment that is different from the first traffic pattern data. Example operation 1006 represents determining, by the system, second window parameter data for a second intercell interference avoidance feedback and decision window based on the second operational data, wherein the second window parameter data is different from the first window parameter data. Example operation 1008 represents communicating, by the system to the network node, the second window parameter data.

Further operations can include receiving, by the system from the network node in response to the communicating of the second window parameter data, a communication indicating that the second window parameter data is not supportable by the network node, in response to the communication, determining, by the system, third window parameter data for a third feedback and decision window, and communicating, by the system, the third window parameter data to the network node. The communication can include window parameter data-related information, and determining the third window parameter data can include processing the window parameter data-related information.

Further operations can include receiving, by the system from the network node based on the second window parameter data, second report data representative of second interference pattern data with respect to the user equipment, determining, by the system based on the second report data, second intercell interference avoidance data, and communicating, by the system, the second intercell interference avoidance data to the network node.

FIG. 11 summarizes various example operations, e.g., corresponding to a machine-readable medium, comprising executable instructions that, when executed by a processor, facilitate performance of operations. Example operation 1102 represents obtaining first operational data of a first user equipment, the first operational data comprising first traffic data of the first user equipment. Example operation 1104 represents obtaining second operational data of a second user equipment, the second operational data comprising second traffic data of the second user equipment. Example operation 1106 represents prioritizing the first user equipment ahead of the second user equipment based on the first operational data and the second operational data. Example operation 1108 represents generating, based on the first operational data, first recommended window parameter data for a first intercell interference avoidance feedback and decision window with respect to the first user equipment. Example operation 1110 represents communicating the first window parameter data to a network node. Example operation 1112 represents generating, based on the second operational data, second recommended window parameter data for a second intercell interference avoidance feedback and decision window with respect to the second user equipment. Example operation 1114 represents communicating the second window parameter data to the network node.

Further operations can include obtaining third operational data of the first user equipment, the third operational data comprising third traffic data of the first user equipment, generating, based on the third operational data, third recommended window parameter data for a third intercell interference avoidance feedback and decision window with respect to the first user equipment, and communicating the third window parameter data to the network node.

Further operations can include receiving, from the network node in response to the communicating of the second window parameter data, a communication indicating that the second window parameter data is not supportable by the network node, in response to the communication, generating, based on the second operational data, third recommended window parameter data for a third intercell interference avoidance feedback and decision window with respect to the second user equipment, and communicating the third window parameter data to the network node.

Generating of the second recommended window parameter data can include determining first candidate window parameter data for the second recommended window parameter data, evaluating, in a first evaluation, whether the first candidate window parameter data complies with network capability data, determining, based on the first evaluation, that the first candidate window parameter data does not comply with network capability data, in response to the determining that the first candidate window parameter data does not comply with the network capability data, determining second candidate window parameter data for the second recommended window parameter data, evaluating, in a second evaluation, whether the second candidate window parameter data complies with the network capability data, determining, based on the second evaluation, that the second first candidate window parameter data complies with the network capability data, and in response to the determining that the first candidate window parameter data complies with the network capability data, selecting the second candidate window parameter data as the second window parameter data for communication to the network node.

As can be seen, the technology described herein facilitates adaptive feedback and decision window sizing and frequency based on various dynamic data, such as UE traffic pattern data. A controller (RIC) attempts to dynamically optimize the frequency and TTI scope of the intercell interference avoidance feedback and decision windows to be transmitted. This decision by the RIC is based on continuously (near-continuously) collecting measurements and KPIs from the RAN E2 node, i.e., DU, over the E2 interface connecting them. For each UE, the RIC checks and identifies criteria, including the UE traffic model, identified through its packet inter-arrival rate, and/or UE QoS requirements (e.g., delay). For each RAN E2 node, the RIC gathers performance capabilities reports for capability criteria including network function infrastructure processing capabilities and network function link capacity.

In one or more example implementations, once the RIC identifies the optimal feedback window frequency and size, the RIC sends a subscription request to the E2 node over the E2 interface with that information. The E2 node can accept the subscription and accordingly adjust its feedback window transmission or reject the request; if rejected the RIC will then re-process the decision based on the returned response.

With the reported UE data returned in the window, in addition to dynamically adapting the size and periodicity of feedback window, the RIC can output muting decisions for each UE based on the type of traffic (e.g., periodic vs. aperiodic), network function processing capability and QoS requirements.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
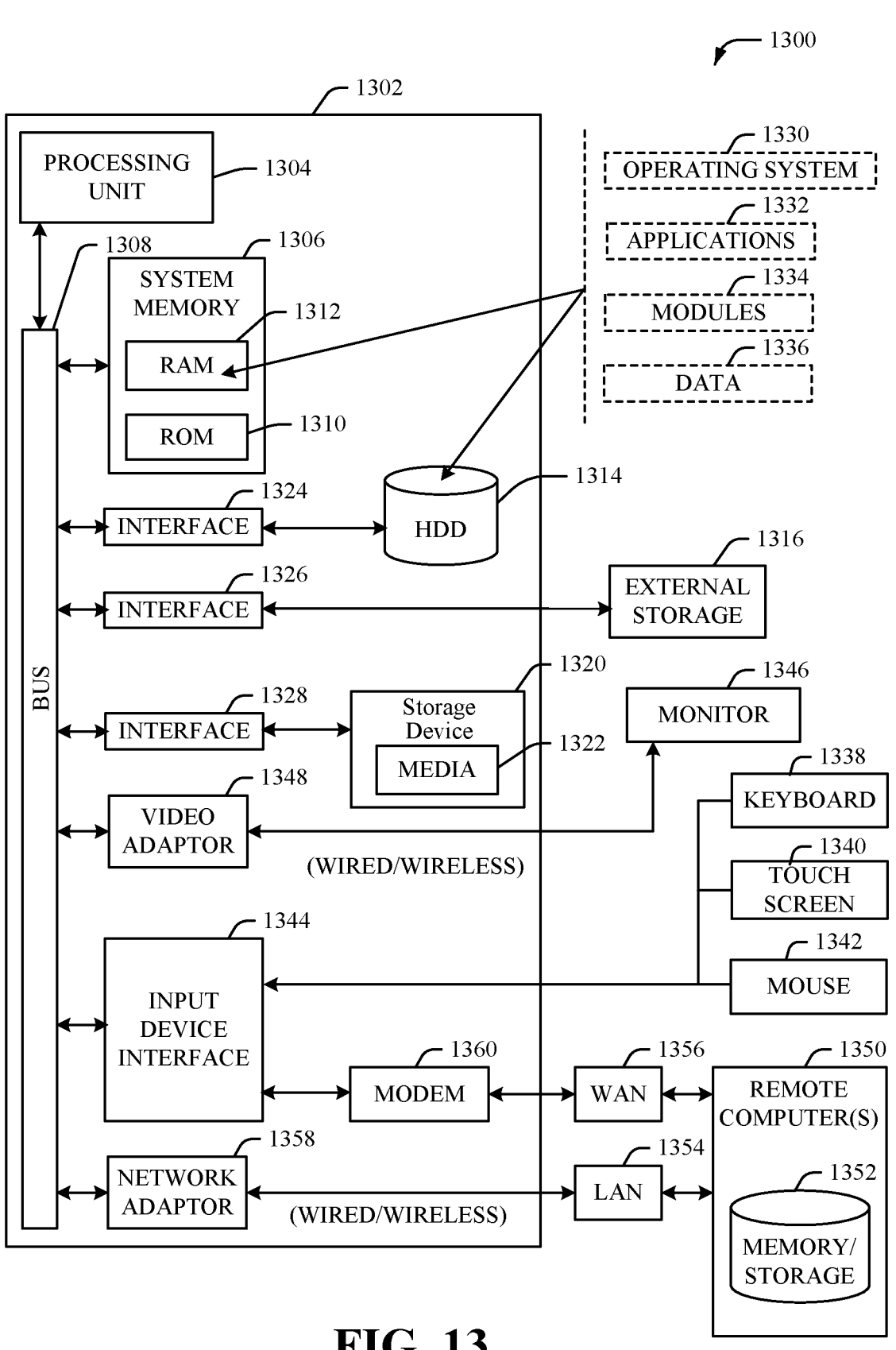
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "of" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

at least one processor; and at least one memory that stores executable instructions that, when executed by the at least one processor, facilitate performance of operations, the operations comprising:

receiving, from a network node communicatively coupled to a user equipment, operational data comprising traffic pattern data representative of a traffic pattern associated with the user equipment;

determining, for the user equipment, a use case type of a group of use case types based on the traffic pattern data;

based on the use case type, determining, for the user equipment, window parameter data for a reporting window for sending a report comprising interference pattern data representative of an interference pattern applicable to the user equipment, wherein the window parameter data comprises at least one of a window frequency that defines a frequency of occurrence of the reporting window for sending the report to the network equipment or window size data that defines a size of the reporting window applicable to a size of the report;

communicating the window parameter data to the network node;

receiving, from the network node based on the window parameter data, the report associated with the user equipment;

determining, based on the report, intercell interference avoidance data usable to facilitate a selection of network resources for communications with respect to the user equipment; and communicating the intercell interference avoidance data to the network node.

2. The network equipment of claim 1, wherein the window size specifies a quantity of time slots in the window for transmitting the report.

3. The network equipment of claim 1, wherein the operational data further comprises quality of service-related data representative of a quality of service specification applicable to the user equipment, and wherein determining the use case type for the user equipment is based further on the quality of service-related data.

4. The network equipment of claim 1, wherein the operational data further comprises performance capability data representative of a performance capability of the network node, and wherein determining the window parameter data is based further on the performance capability data.

5. The network equipment of claim 4, wherein the performance capability data of the network node comprises at least one of: network function infrastructure capability data representative of a network function infrastructure capability, or network function link capacity data representative of a network function link capability.

6. The network equipment of claim 1, wherein the window parameter data is first window parameter data for a first reporting window, wherein the operational data is first operational data, wherein the traffic pattern data is first traffic pattern data representative of a first traffic pattern associated with the user equipment, wherein the use case type is a first use case type, wherein the report is a first report, wherein the interference pattern data is first interference pattern data, and wherein the operations further comprise:

determining, based on information returned by the network node, that the first operational data has changed to second operational data that is different from the first operational data, the second operational data comprising second traffic pattern data, representative of a second traffic pattern associated with the user equipment, that is different from the first traffic pattern data;

determining, for the user equipment, a second use case type of the group of use case types based on the second traffic pattern data;

based on the second use case type, determining, for the user equipment, second window parameter data for a second reporting window for sending a second report comprising second interference pattern data associated with the user equipment, wherein the second window parameter data is different from the first window parameter data and is usable to facilitate a further selection of the network resources for further communications with respect to the user equipment; and communicating, to the network node, the second window parameter data.

7. The network equipment of claim 6, wherein the operations further comprise:

receiving, from the network node in response to the communicating of the second window parameter data, a communication indicating that the second window parameter data is not supportable by the network node;

in response to the communication, determining third window parameter data for a third reporting window that is different from the first reporting window and the second reporting window; and communicating the third window parameter data to the network node.

8. The network equipment of claim 7, wherein the communication comprises window parameter data-related information, and wherein the determining of the third window parameter data comprises processing the window parameter data-related information.

9. The network equipment of claim 1, wherein the network equipment comprises a radio access network intelligent controller, and wherein the communicating of the window parameter data to the network node comprises sending a subscription request from the radio access network intelligent controller to the network node.

10. The network equipment of claim 1, wherein the network node comprises at least one of: a centralized unit, a distributed unit, or a radio unit.

11. The network equipment of claim 1, wherein the report comprises at least one of hybrid automatic repeat request information of the user equipment or reference signal received quality information of the user equipment.

12. The network equipment of claim 1, wherein the traffic pattern data comprises packet interarrival rate data representative of a packet interarrival rate applicable to communicating with the user equipment.

13. A method, comprising:

obtaining, by a system comprising at least one processor, from a network node communicatively coupled to a user equipment, first operational data comprising first traffic pattern data and first quality of service constraint data of the user equipment;

determining, by the system, for the user equipment, a first use case type of a group of use case types based on the first traffic pattern data and the first quality of service constraint data;

based on the first use case type, determining, by the system, first window parameter data for a first reporting window for sending a first report comprising first interference pattern data associated with the user equipment, wherein the first window parameter data comprises at least one of a first window frequency that defines a first frequency of occurrence of the first reporting window for sending the first report to network equipment or first window size data that defines a first size of the first reporting window applicable to a first size of the first report;

communicating, by the system to the network node, the first window parameter data;

based on the first window parameter data, receiving, by the system from the network node, the first report associated with the user equipment;

based on the first report data, determining, by the system, first intercell interference avoidance data;

communicating the first intercell interference avoidance data to the network node;

determining, based on information returned by the network node, that the first operational data has changed to second operational data that is different from the first operational data, the second operational data comprising second traffic pattern data of the user equipment that is different from the first traffic pattern data;

determining, by the system, for the user equipment, a second use case type of the group of use case types based on the second traffic pattern data and the first quality of service constraint data, wherein the second use case type is different from the first use case type;

based on the second use case type and the first quality of service constraint data, determining, by the system, second window parameter data for a second reporting window for sending a second report comprising second interference pattern data associated with the user equipment, wherein the second window parameter data comprises at least one of a second window frequency that defines a second frequency of occurrence of the second reporting window for sending the second report to the network equipment or second window size data that defines a second size of the second reporting window applicable to a second size of the second report, and wherein the second window parameter data is different from the first window parameter data; and communicating, by the system to the network node, the second window parameter data.

14. The method of claim 13, further comprising:

receiving, by the system from the network node in response to the communicating of the second window parameter data, a communication indicating that the second window parameter data is not supportable by the network node, in response to the communication, determining, by the system, third window parameter data for a third reporting window for sending the second report based on the second use type and the first quality of service constraint data, wherein the third window parameter data comprises at least one of a third window frequency that defines a third frequency of occurrence of the third reporting window for sending the second report to the network equipment or third window size data that defines a third size of the third reporting window applicable to a third size of the second report, and wherein the third window parameter data is different from the first window parameter data and the second window parameter data, and communicating, by the system, the third window parameter data to the network node.

15. The method of claim 14, wherein the communication comprises window parameter data-related information, and wherein the determining of the third window parameter data is based further on the window parameter data-related information.

16. The method of claim 13, further comprising:

receiving, by the system from the network node based on the second window parameter data, the second report associated with the user equipment, determining, by the system based on the second report, second intercell interference avoidance data, and communicating, by the system, the second intercell interference avoidance data to the network node.

17. A non-transitory machine-readable medium, comprising executable instructions that, when executed by at least one processor of network equipment, facilitate performance of operations, the operations comprising:

obtaining, from a network node, first operational data of a first user equipment communicatively coupled to the network node, the first operational data comprising first traffic data of the first user equipment;

obtaining second operational data of a second user equipment communicatively coupled to the network node, the second operational data comprising second traffic data of the second user equipment;

prioritizing the first user equipment ahead of the second user equipment based on the first operational data and the second operational data;

determining, for the first user equipment, a first use case type of a group of use case types based on the first operational data;

generating, based on the first use case type, first recommended window parameter data for a first reporting window for sending a first report comprising first interference pattern data associated with the first user equipment, wherein the first recommended window parameter data comprises at least one of a first window frequency that defines a first frequency of occurrence of the first reporting window for sending the first report to the network equipment or first window size data that defines a first size of the first reporting window applicable to a first size of the first report;

communicating the first recommended window parameter data to the network node;

determining, for the second user equipment, a second use case type of the group of use case types based on the second operational data;

generating, based on the second use case type, second recommended window parameter data for a second reporting window for sending a second report comprising second interference pattern data associated with the second user equipment, wherein the second recommended window parameter data comprises at least one of a second window frequency that defines a second frequency of occurrence of the second reporting window for sending the second report to the network equipment or second window size data that defines a second size of the second reporting window applicable to a second size of the second report; and communicating the second recommended window parameter data to the network node.

18. The non-transitory machine-readable medium of claim 17, wherein the operations further comprise;

obtaining third operational data of the first user equipment, the third operational data comprising third traffic data of the first user equipment;

determining, for the first user equipment, a third use case type of the group of use case types based on the third operational data, wherein the third use case type is different from the first use case type;

generating, based on the third use case type, third recommended window parameter data for a third reporting window for sending a third report comprising third interference pattern data associated with the first user equipment, wherein the third recommended window parameter data comprises at least one of a third window frequency that defines a third frequency of occurrence of the third reporting window for sending the third report to the network equipment or third window size data that defines a third size of the third reporting window applicable to a third size of the third report; and communicating the third recommended window parameter data to the network node.

19. The non-transitory machine-readable medium of claim 17, wherein the operations further comprise;

receiving, from the network node in response to the communicating of the second recommended window parameter data, a communication indicating that the second recommended window parameter data is not supportable by the network node;

in response to the communication, generating, based on the second use case type, third recommended window parameter data for a third reporting window for sending a third report comprising third interference pattern data associated with the second user equipment, wherein the third recommended window parameter data comprises at least one of a third window frequency that defines a third frequency of occurrence of the third reporting window for sending the third report to the network equipment or third window size data that defines a third size of the third reporting window applicable to a third size of the third report; and communicating the third recommended window parameter data to the network node.

20. The non-transitory machine-readable medium of claim 17, wherein the generating of the second recommended window parameter data comprises:

determining first candidate window parameter data for the second recommended window parameter data, evaluating, in a first evaluation, whether the first candidate window parameter data complies with network capability data, determining, based on the first evaluation, that the first candidate window parameter data does not comply with the network capability data, in response to the determining that the first candidate window parameter data does not comply with the network capability data, determining second candidate window parameter data for the second recommended window parameter data, evaluating, in a second evaluation, whether the second candidate window parameter data complies with the network capability data, determining, based on the second evaluation, that the second candidate window parameter data complies with the network capability data, and in response to the determining that the second candidate window parameter data complies with the network capability data, selecting the second candidate window parameter data as the second recommended window parameter data for communication to the network node.

\* \* \* \* \*